(12) United States Patent
Orjebin et al.

(10) Patent No.: US 12,247,404 B2
(45) Date of Patent: Mar. 11, 2025

(54) FACADE MODULE AND ASSOCIATED BUILDING FACADE

(71) Applicants: KERNEX, Paris (FR); AGC Glass Europe, Louvain-la-Neuve (BE)

(72) Inventors: Pierre Orjebin, Vincennes (FR); Francois Winkel, Meyzieu (FR); Richard Theron, Chirens (FR)

(73) Assignees: MINERAL EXPERTISE, Paris (FR); AGC Glass Europe, Louvain-la-Neuve (BE)

( * ) Notice: Subject to any disclaimer, the term of this patent is extended or adjusted under 35 U.S.C. 154(b) by 168 days.

(21) Appl. No.: 17/916,762

(22) PCT Filed: Apr. 1, 2021

(86) PCT No.: PCT/EP2021/058707
§ 371 (c)(1),
(2) Date: Oct. 3, 2022

(87) PCT Pub. No.: WO2021/198468
PCT Pub. Date: Oct. 7, 2021

(65) Prior Publication Data
US 2023/0160215 A1    May 25, 2023

(30) Foreign Application Priority Data
Apr. 3, 2020 (FR) .................................... 20 03374

(51) Int. Cl.
*E04F 13/14* (2006.01)
*B32B 3/06* (2006.01)
(Continued)

(52) U.S. Cl.
CPC ............ *E04F 13/144* (2013.01); *B32B 3/06* (2013.01); *B32B 7/12* (2013.01); *B32B 9/002* (2013.01);
(Continued)

(58) Field of Classification Search
CPC . E04F 13/144; E04F 13/0837; E04F 13/0866; B32B 3/06; B32B 7/12;
(Continued)

(56) References Cited

U.S. PATENT DOCUMENTS 5,014,477 A * 5/1991 MacDonald .......... E06B 3/5427
52/204.593
5,375,385 A * 12/1994 Feder .................... E04F 13/144
52/596

(Continued)

FOREIGN PATENT DOCUMENTS

CN  204199500    3/2015
DE  196 13 439   11/1996
(Continued)

OTHER PUBLICATIONS

International Search Report dated Jun. 18, 2021, for PCT/EP2021/058707, 7 pp., including English translation.
(Continued)

*Primary Examiner* — Gisele D Ford
(74) *Attorney, Agent, or Firm* — Knobbe, Martens, Olson & Bear, LLP

(57) ABSTRACT

A facade module for separating an interior from an exterior of a building volume includes: a partition plate, including an inner face and an outer face, the partition plate including an inner glazed layer forming the inner face; and a fastening element of the partition plate suitable for fastening the partition plate to a building structure. The partition plate includes at least one stone layer forming the outer face of the partition plate and/or extending over the inner glazed layer.

12 Claims, 3 Drawing Sheets

(51) Int. Cl.
  *B32B 7/12* (2006.01)
  *B32B 9/00* (2006.01)
  *B32B 17/06* (2006.01)
  *E04B 2/88* (2006.01)
  *E04B 2/92* (2006.01)
  *E04F 13/08* (2006.01)

(52) U.S. Cl.
  CPC .......... *B32B 17/06* (2013.01); *E04F 13/0837* (2013.01); *E04F 13/0866* (2013.01); *B32B 2307/41* (2013.01); *B32B 2307/732* (2013.01); *B32B 2607/00* (2013.01); *E04B 2/88* (2013.01); *E04B 2/92* (2013.01)

(58) Field of Classification Search
  CPC ..... B32B 9/002; B32B 17/06; B32B 2307/41; B32B 2307/732; B32B 2607/00; E04B 2/92; E04B 2/88
  See application file for complete search history.

(56) References Cited

U.S. PATENT DOCUMENTS

| | | | | |
|---|---|---|---|---|
| 5,802,799 | A * | 9/1998 | Thuleskar | E06B 3/5427 52/204.597 |
| 6,401,410 | B2 * | 6/2002 | Kenny | E06B 3/5427 52/235 |
| 2004/0261345 | A1 * | 12/2004 | McGrath | E04F 13/147 52/506.01 |
| 2007/0056236 | A1 * | 3/2007 | Lobson | E04F 13/0891 52/311.1 |
| 2009/0235600 | A1 * | 9/2009 | Logan | B28B 13/0275 264/232 |
| 2009/0241466 | A1 * | 10/2009 | Gussakovsky | E04B 2/88 52/745.16 |
| 2010/0325993 | A1 * | 12/2010 | Bolin | B29C 44/10 52/794.1 |
| 2012/0066991 | A1 * | 3/2012 | Swartz | E06B 3/5427 52/745.12 |
| 2014/0083033 | A1 * | 3/2014 | McIntosh | E04F 13/0885 52/302.1 |

FOREIGN PATENT DOCUMENTS

| | | |
|---|---|---|
| DE | 299 07 526 | 9/1999 |
| EP | 2 444 579 | 4/2012 |
| WO | 2018/041539 | 3/2018 |

OTHER PUBLICATIONS

Written Opinion dated Jun. 18, 2021, for PCT/EP2021/058707, 9 pp., including English translation.
French Search Report dated Nov. 24, 2020, for FR 2003374, 2 pp.

* cited by examiner

FACADE MODULE AND ASSOCIATED BUILDING FACADE

CROSS-REFERENCE TO RELATED APPLICATION(S)

This application is the U.S. national phase of International Application No. PCT/EP2021/058707 filed Apr. 1, 2021, which designated the U.S. and claims priority to FR 2003374 filed Apr. 3, 2020, the entire contents of each of which are hereby incorporated by reference.

BACKGROUND OF THE INVENTION

Field of the Invention

The present invention relates to a facade module for separating an interior from an exterior of a building volume, comprising:
- a partition plate, comprising an inner face and an outer face, the partition plate comprising an inner glazed layer forming the inner face, and
- a partition plate fastening element suitable for fastening the partition plate to a building structure.

The invention applies to facade modules intended for separating an interior from an exterior of a building volume. The invention applies more particularly to facade modules intended for separating the interior from the exterior of a building.

Description of the Related Art

Large buildings require light and aesthetically pleasing facades for separating the interior of the building from the exterior of the building.

For this purpose, it is known how to use facades called curtain facades or curtain walls. Such facades include a plurality of facade modules fastened to a structure of the building.

The facade modules include a partition plate fastened to the building structure by means of a retaining element. The partition plate comprises e.g. a glazed layer with a large surface area, generally greater than 1 m², which separates the interior from the exterior of the building.

Such facade modules, in particular, due to the use of a partition plate with a glazed layer with a large surface area, can be used for obtaining a light and aesthetically pleasing facade.

However, such facade modules are not entirely satisfactory. Indeed, the use of partition plates wherein a glazed layer, does not give great freedom with regard to the final aesthetics of the facade, facades comprising such facade modules all having a similar appearance.

SUMMARY OF THE INVENTION

A goal of the invention is to propose a facade module offering an wider choice of aesthetically pleasing appearances for a facade.

To this end, the subject matter of the invention is a facade module as mentioned above, comprising a stone layer forming the outer face of the partition plate and/or extending over the inner glazed layer.

A partition plate comprising a stone layer forming the outer face of the partition plate is particularly advantageous since same can be used for forming facades with various, aesthetically pleasing appearances. Such a partition plate also makes it possible to use the stone as a covering and not as a structural element, thus reducing the cost and the weight of a facade formed from such a facade module.

According to other optional aspects of the invention, the facade module includes one or a plurality of the following features, taken individually or according to all technically possible combinations:
- the stone layer consists of a group of pieces of stone, the group of pieces of stone comprising a plurality of pieces of stone and a binding agent, the binding agent connecting the pieces of stone together;
- the stone layer includes between one and ten pieces of stone, each piece of stone being a slice of stone with a thickness of between 3 mm and 12 mm;
- the pieces of stone of the group of pieces of stone consist of at least one opaque ornamental stone, preferentially selected from the list consisting of: marble, granite, quartz, limestone;
- the surface area of the partition plate is greater than 1 m²;
- the partition plate comprises a bonding agent bonding the inner glazed layer and the stone layer;
- the partition plate comprises an intermediate glazed layer, the intermediate glazed layer extending between the inner glazed layer and the stone layer, the partition plate comprising a bonding agent bonding the intermediate glazed layer and the stone layer; and
- the fastening element comprises:
  - a base, intended to be rigidly attached to the building structure;
  - a cramp iron; and
  - a locking means, connecting the base to the cramp iron and suitable for moving the cramp iron between a free position and a locking position, wherein the cramp iron presses the inner glazed layer against the base, the fastening element being suitable for holding the partition plate on the building structure when the cramp iron is in the locking position.

The invention further relates to a building facade comprising at least one facade module as described above and a building structure, the fastening element fastening the partition plate to the building structure.

According to an optional aspect of the aforementioned building facade, the facade module comprises at least two partition plates fastened to the building structure by a single fastening element, the fastening element extending between the two partition plates.

BRIEF DESCRIPTION OF THE DRAWINGS

The invention will be better understood upon reading the following description, given only as an example, but not limited to, and making reference to the drawings wherein.

DESCRIPTION OF THE PREFERRED EMBODIMENTS

In the following description, a direct orthonormal base (X, Y, Z) is considered.

The elevation direction Z is defined along the height of the facade module and corresponds e.g. to the vertical direction of a building. The through direction X corresponds to the inside-outside direction with respect to the building volume, the direction X being substantially perpendicular to the plane wherein the facade extends. The lateral direction Y corresponds to the direction along which the facade extends perpendicular to the elevation direction Z.

A person skilled in the art will understand from reading the present document that the Z direction and the Y direction can be switched, so that the Z direction corresponds to the lateral direction and the Y direction corresponds to the elevation direction.

A person skilled in the art will also understand that the axes of the direct orthonormal base (X, Y, Z) are oriented in any direction, the direction Z defining the height of the facade module which is e.g. at an angle with respect to the vertical direction of the building. In a particular embodiment, the axis Z is e.g. perpendicular to the vertical direction of the building.

Figure 2:
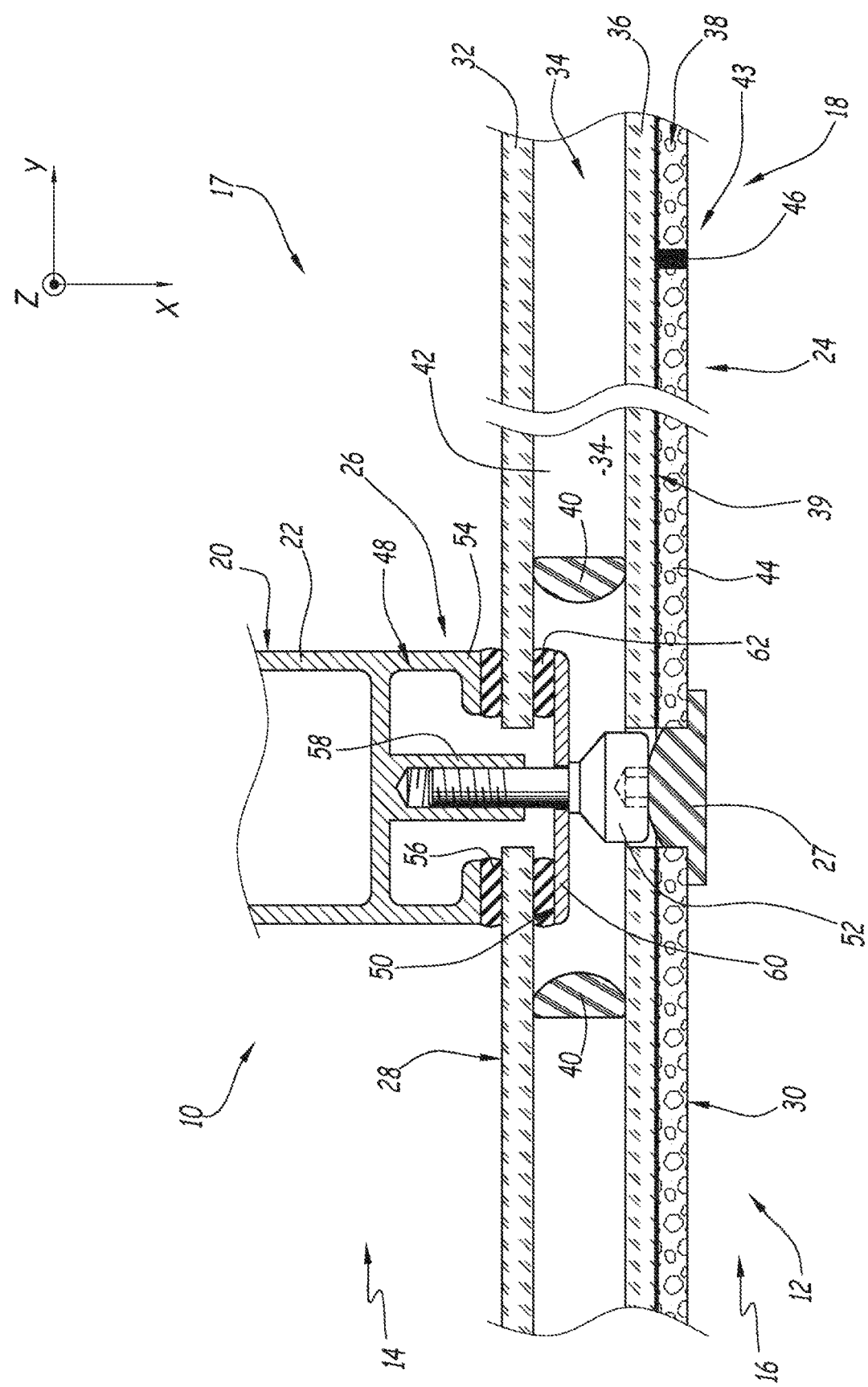
FIG. 2 is a sectional view along a section plane A-A' shown in FIG. 1 of a building facade comprising the partition plate shown in FIG. 1.

With reference to FIG. 2, a building 10 includes at least one facade 12. The building 10 is e.g. a residential building or an office building.

The facade 12 is intended for separating at least partially, an interior 14 from an exterior 16 of a building volume 17. The building volume 17 is e.g. one room or rooms of the building 10, the interior 14 then being the inside of the room or rooms and the exterior 16 then being the outside of the room or rooms. The exterior 16 is preferentially the exterior of the building 10.

The facade 12 comprises at least one facade module 18 and a building structure 20.

The building structure 20 comprises e.g. a set of beams 22 extending along the elevation direction Z and along the transverse direction Y. The building structure 20 is e.g. anchored to a foundation (not shown) of the building 10.

Every beam 22 is e.g. an extruded aluminum profile or any other building material.

According to an embodiment (not shown), the building structure comprises at least one articulation element, the beams 22 of the building structure being mobile around the articulation element or elements. The beams 22 are e.g. configured to be able to rotate about an axis parallel to the elevation direction Z or to the lateral direction Y over an angle comprised between 0° and 90°, preferentially between 0° and 45° with respect to the plane Y, Z.

The facade module 18 is rigidly attached to the building structure 20 and in particular to the beams 22.

The facade module 18 is intended for separating part of the interior 14 from the exterior 16 of the building volume 17.

The facade module 18 comprises at least one partition plate 24 and a fastening element 26 for the partition plate 24. In the variant shown in FIG. 2, the front module 18 comprises two partition plates 24 and a fastening element 26.

The facade module 18 comprises e.g. a main seal 27.

The partition plate 24 is rigidly attached to at least one fastening element 26 and advantageously to two fastening elements 26 extending on either side of the partition plate 24.

Figure 1:
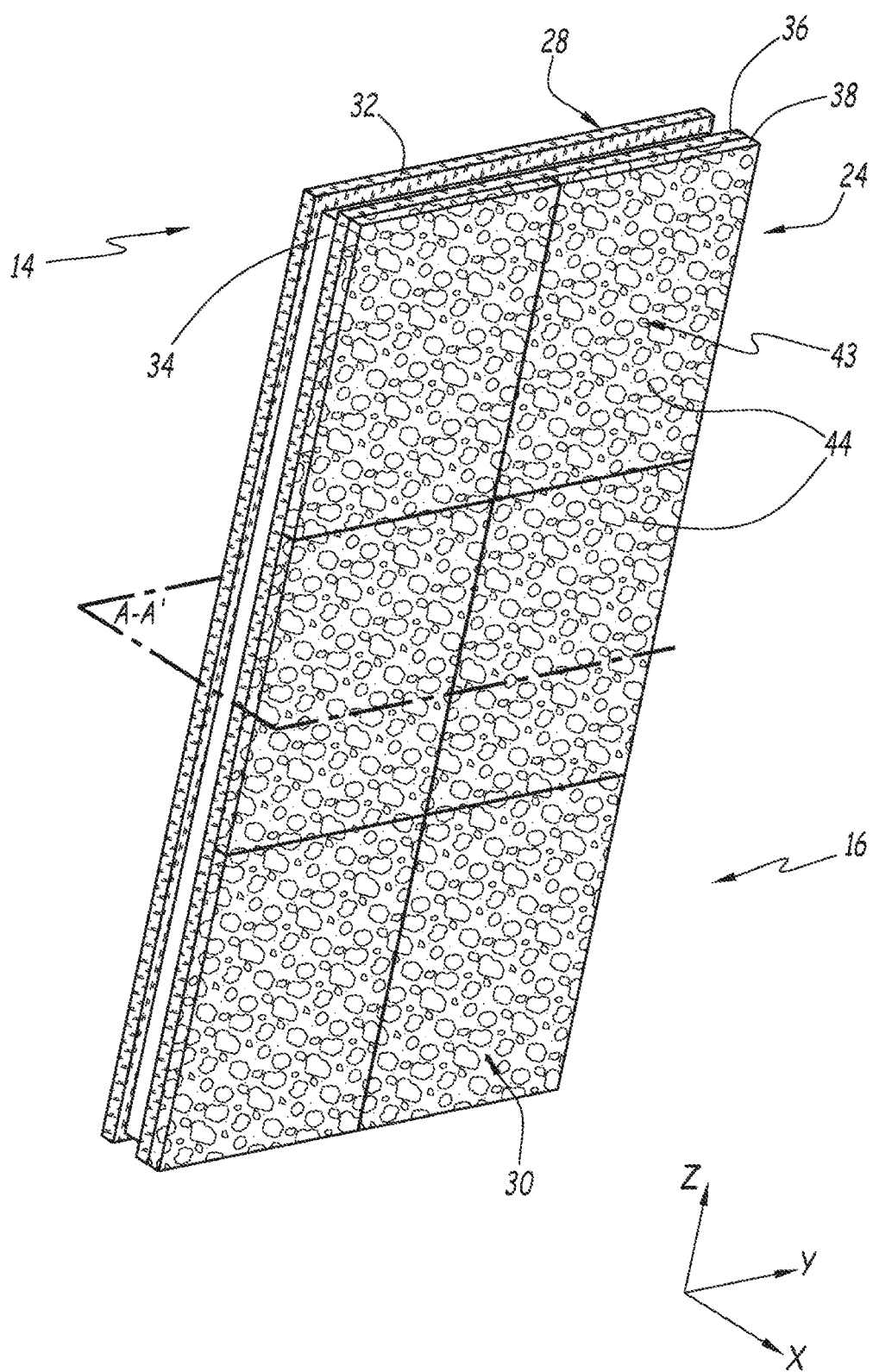
FIG. 1 is a perspective view of a partition plate of a facade module according to an embodiment of the invention.

According to the variant shown in FIG. 1, the partition plate 24 is substantially rectangular and extends in the plane Y-Z. The surface area of the partition plate 24, taken in the Y-Z plane, is preferentially greater than 1.00 m². The height of the partition plate 24, taken along the elevation direction Z, is e.g. between 1 m and 10 m, preferentially between 2 m and 6 m. The width of the partition plate 24, taken along the lateral direction Y, is e.g. between 0.5 m and 3 m, preferentially between 1 m and 2 m. As a variant, the partition plate 24 has any shape. The length then corresponds to the highest dimension of the partition plate 24 and the width then corresponds to the smallest dimension of the partition plate 24 taken perpendicularly to the through direction X.

The partition plate 24 comprises an inner face 28, intended for extending opposite the interior 14, and an outer face 30, intended for extending opposite the exterior 16, the inner face 28 being opposite the outer face 30 in the through direction X.

The partition plate 24 comprises an inner glazed layer 32, an insulation layer 34 and a stone layer 38. In the embodiment described thereafter, the partition plate further comprises an intermediate glazed layer 36. In such embodiment, the inner glazed layer 32, the insulation layer 34, the intermediate glazed layer 36 and the stone layer 38 extend between the inner face 28 and the outer face 30 and are each preferentially of the same width along the lateral direction Y and of the same height along the elevation direction Z as the partition plate 24.

The partition plate 24 advantageously comprises a bonding agent 39. The bonding agent is e.g. a glue or a resin.

With reference to FIG. 2, the inner glazed layer 32 forms the inner face 28. The inner glazed layer 32 is e.g. formed by a monolithic glass panel. In a variant (not shown), the inner glazed layer consists of a plurality of monolithic glass panels stacked along the through-flow direction X and separated e.g. by polymer layers, so as to form an inner glazed layer of laminated glass.

The insulating layer 34 extends between the inner glazed layer 32 and the intermediate glazed layer 36. The insulating layer 34 comprises a spacer 40 connecting the inner glazed layer 32 and the intermediate glazed layer 36, the spacer 40 extending substantially at the periphery of the insulating layer 34.

The spacer 40 forms, together with the inner glazed layer 32 and the intermediate glazed layer 36, an insulated insulation volume 42 (not shown) extending between the inner glazed layer 32, the intermediate glazed layer 36 and a contour formed by the spacer 40.

The insulation volume 42 comprises e.g. an air gap or a noble gas such as argon, krypton or xenon.

The intermediate glazed layer 36 consists e.g. of a monolithic glass panel. In a variant (not shown), the intermediate glazed layer 36 consists of a plurality of monolithic glass panels stacked along the through direction X and separated e.g. by polymer layers, so as to form an intermediate glazed layer 36 of laminated glass.

The inner glazed layer 32 and the intermediate glazed layer 36 are rigidly attached and are fastened to each other by means of the spacer 40.

The stone layer 38 extends over the intermediate glazed layer 36, on the side opposite the insulation layer 34.

The stone layer 38 forms the outer face 30 of the partition plate.

In the preferred variant shown in FIG. 2, the stone layer forms the outer face 30 of the partition plate 24 and extends over the intermediate glazed layer 36.

In a variant which is not illustrated, the stone layer 38 does not form the outer face 30 of the partition plate 24 and extends over the inner glazed layer 32, in particular over the face of the inner glazed layer 32 opposite the inner face 28. In particular, the stone layer 38 then extends between the inner glazed layer 32 and the intermediate glazed layer 36.

The thickness of the stone layer 38, taken in the through direction X, is e.g. between 3 mm and 12 mm, and preferentially between 3 mm and 5 mm.

The stone layer 38 is e.g. fastened to the intermediate glazed layer 36 by the bonding agent 39.

Examples of bonding agent 39 include the usual thermoplastic materials for the formation of laminates such as PVB (polyvinyl butyral), EVA (ethylene vinyl acetate), PU (polyurethane), ionomers, cycloolefin polymers or equivalent materials. Such materials are applied in the form of thermoplastic interlayer sheets which, following a lamination process, can be used for the bonding of the stone layer 38 to the intermediate glazed layer 36. The lamination process comprises, among other methods, the application of a pressure comprised between 1 and 13 bar and the heating to a temperature between 100° C. and 170° C., the temperature typically depending on the type of thermoplastic material. The type of lamination process is typically known to a person skilled in the art, and is not the subject matter of the present invention.

The stone layer 38 preferentially consists of a group of pieces of stone 43. The group of pieces of stone 43 forming the stone layer comprises a plurality of pieces of stone 44 and a binding agent 46 connecting the pieces of stone 44 to each other.

The stone layer includes e.g. between one and ten pieces of stone, and preferentially between one and six pieces of stone.

The binding agent 46 is e.g. an adhesive or a resin. The binding agent 46 bonds e.g. the pieces of stone 44 together. The binding agent 46 is e.g. the bonding agent 39 and then bonds the pieces of stone 44 to the intermediate glazed layer 36, and bonds same therebetween.

Every piece of stone 44 is e.g. a slice of stone with a thickness comprised between 2 mm and 12 mm, and preferentially between 3 mm and 5 mm. All the pieces of stone 44 of the stone layer 38 have e.g. the same thickness, so that the thickness of every piece of stone 44 is equal to the thickness of stone layer 38.

Every piece of stone 44 is e.g. a slice of stone with a dimension of at least 30 cm on the side thereof. In certain configurations, pieces of stone can have a side dimension of at least 85 cm, or of at least 1.25 m, or of at least 1.55 m, or of at least 2.05 m, depending on the material considered. The pieces of stone have a side dimension up to 3.55 m and of at most 6.05 m.

The pieces of stone 44 consist of an opaque stone. As a variant, the pieces of stone 44 consist of a translucent stone.

The pieces of stone 44 consist e.g. of a stone chosen from the list comprising: marble, granite, quartz, limestone. The pieces of stone 44 consist e.g. of a stone chosen from any type of ornamental stone.

The pieces of stone 44 consist in particular of limestone called "Saint Clair", granite called "Bethel white", granite called "Noir Saint Henry", limestone called "Branco do mar", limestone called "Pierre de Lens" or marble called "Estremoz".

The pieces of stone 44 are chosen according to technical features or to the desired appearance for the facade 12.

All the pieces of stone 44 of the stone layer preferentially come from the same stone. In particular, the pieces of stone 44 are arranged in the stone layer 38 so as to minimize the visual discontinuities between each of the pieces of stone 44. Thus, two adjacent pieces of stone 44 of the stone layer 38 have similar patterns, particularly near the interface between the two adjacent pieces of stone 44. A stone pattern e.g. refers to the arrangement of veins in the stone, the veins of a piece of stone 44 being e.g. arranged so as to be in the continuity of the veins of a piece of stone 44 adjacent thereof.

Alternatively, the pieces of stone 44 of the stone layer come from different stones. Such variant has the advantage of providing varied decorations, depending on the types of stone used, with a surface either homogeneous or with patterns, like in marquetry.

The pieces of stone 44 have a density advantageously comprised between 2000 and 3000 kg/m$^3$.

The pieces of stone 44 are suitable for withstanding an external environment. The pieces of stone 44 have e.g. a low sensitivity to frost.

The fastening element 26 comprises a base 48, a cramp iron 50 and a locking means 52. The fastening element preferentially comprises a plurality of cramp irons 50 and of locking means 52.

The fastening element 26 is suitable for fastening the at least one partition plate 24 of the facade module 18 to the structure of the building 20.

In the example shown in FIG. 2, the same fastening element 26 is suitable for fastening two partition plates 24 to the structure of the building 20, the fastening element extending between the two partition plates 24.

The base 48 preferentially comprises an elongated section 54 and at least one inner seal 56. In the variant shown in FIG. 2, the base comprises two inner seals 56.

The base 48 is preferentially anchored to the building structure 20.

The elongated section 54 is e.g. elongated along a length oriented along the elevation direction Z or along the lateral direction Y. The elongated section is e.g. an extruded section of aluminum. According to a particular variant, the elongated section 54 is connected to the beam 22 so that the elongated section 54 and the beam 22 form a one-piece assembly.

The elongated section 54 comprises at least one insertion portion 58 of the locking means 52. In the example shown FIG. 2, the insertion portion 58 of the locking means 52 is a tapped hole.

Every inner seal 56 extends between the inner face 28 of the partition plate 24 and the elongated section 54. Every inner seal 56 is preferentially pressed between the inner face 28 and the elongated section 54. Every inner seal 56 preferentially extends along the entire length of the elongated section 54.

The cramp iron 50 preferentially comprises a tightening bar 60 and an intermediate seal 62. In the variant shown in FIG. 2, the cramp iron 50 comprises 2 intermediate seals.

The cramp iron 50 can move between a free position and a locking position.

In the locking position, the cramp iron 50 is suitable for pressing the inner glazed layer 28 against the base 48. In the locking position thereof, the cramp iron 50 is in particular suitable for holding the partition plate 24 onto the building structure 20. In the locking position thereof, the cramp iron 50 is in particular suitable for tightening the inner seal 56 and the intermediate seal 62 on either side of the inner glazed layer 32.

In the variant shown in FIG. 2, in the locking position thereof, the cramp iron 50 is in particular suitable for simultaneously pressing the inner glazed layer 28 of two partition plates 24 against the base 48 and for holding two partition plates 24 onto the building structure 20.

In the free position thereof, the cramp iron 50 is in particular suitable for being apt to move independently of the base 48.

The cramp iron 50 includes a portion for letting through the locking means 52, suitable for receiving the locking means 52.

The locking means 52 connects the base 48 to the cramp iron 50. The locking means 52 is suitable for moving the cramp iron 50 between the free position and the locking position.

The locking means 52 is suitable for holding the cramp iron 50 in the locking position and thus holding the partition plate 24 onto the building structure 20.

The cramp iron 50 is e.g. moved between the free position thereof and the locking position thereof by moving the tightening bar 60 with respect to the base 48. In particular, the cramp iron 50 is moved from the free position to the locking position thereof by moving the tightening bar 60 toward the base 48 and the cramp iron 50 is moved from the locking position thereof to the free position thereof by moving the tightening bar 60 away from the base 48.

In a particular variant, the tightening bar 60 is elongated along an elongation direction and is movable in rotation about an elongation axis of the locking means 52. The elongation direction of the tightening bar 60 preferentially extends parallel to an edge of the partition plate 24 when the cramp iron 50 is in the free position thereof. The direction of elongation of the tightening bar 60 extends e.g. into the space formed between two adjacent partition plates 24 when the cramp iron is in the free position thereof. The tightening bar 60 preferentially extends perpendicularly to an edge of the partition plate 24 when the cramp iron 50 is in the locking position thereof, so that the partition plate can be arranged in an installed position before the cramp iron is fitted in the locking position thereof. The tightening bar 60 extends e.g. at least partially between the inner glazed layer 32 and the intermediate glazed layer 36 of at least one partition plate 24 when the cramp iron is in the locking position thereof.

In such particular variant, the cramp iron 50 is e.g. moved between the free position thereof and the locking position thereof by rotating the tightening bar 60, e.g. by a quarter of a turn, with respect to the base 48, combined with a movement of the tightening bar 60 either toward or away from the base 48.

As illustrated in FIG. 2, the main seal 27 extends e.g. when the cramp iron 50 is in the locking position, between the stone layer 38 of two partition plates 24. The main seal extends e.g. away from the locking means 52 or, as illustrated in FIG. 2, is in contact with the locking means 52.

The main seal 27 is in particular suitable for insulating the base 48, the cramp iron 50 and the locking means 52 from the exterior 16.

The mounting of a facade module 18 according to the invention will now be described.

An inner glazed layer 32, an insulation layer 34 and an intermediate glazed layer 36 are provided for forming an assembly such as a double glazing plate.

A set of pieces of stone 44 are provided after having selected the appearance thereof. The purpose of selecting the pieces of stone 44 is e.g. to ensure the homogeneity of the selected pieces of stone 44 and/or to achieve a desired appearance of the set of the pieces of stone 44.

The pieces of stone 44 are e.g. cut in order to obtain pieces of stone 44 the dimensions of which are suitable for the formation of the stone layer 38.

The pieces of stone 44 are subsequently arranged and the relative position thereof is referenced in order to obtain a harmonious arrangement of the pieces of stone 44. The pieces of stone 44 are preferentially selected and arranged so as to minimize the interfaces between the pieces of stone 44.

Every piece of stone 44 is subsequently rigidly attached to the intermediate glazed layer 36 by means of the bonding agent 39, e.g. following the application of the bonding agent 39 to the piece of stone 44 and/or to the intermediate glazed layer 36, thus forming the partition plate 24. The pieces of stone 44 are in particular bonded to the intermediate glazed layer 36 depending on the relative position thereof as previously referenced. The pieces of stone 44 can be bonded to the intermediate glazed layer 36 via the bonding agent 39 by a lamination process.

When the pieces of stone 44 are rigidly attached to the intermediate glazed layer 36, the bonding agent 39 fills the interface between the pieces of stone 44. The binding agent 46 consists then of the bonding agent 39. Since the pieces of stone 44 are chosen so as to minimize the interfaces between the pieces of stone 44, the interfaces are advantageously not visible to a user observing the facade module 18 as a whole.

The fastening elements 26 are subsequently, beforehand or simultaneously rigidly attached to the building structure 20.

The partition plate 24 thus formed is subsequently rigidly attached to the fastening element 26 and preferentially to two fastening elements 26, each of the fastening elements 26 being mounted on the building structure 20.

The locking means 52 of every fastening element e.g. is then activated. When the locking means 52 is activated, the locking means moves the cramp iron 50 from the free position to the locking position so that the cramp iron 50 presses the inner glazed layer 32 against the base 48. The locking means 52 tightens the inner glazed layer 32 of one or two different partition plates 24 so as to fasten one or two partition plates 24 to the building structure 20.

As a variant, the partition plate 24 is rigidly attached to the fastening element 26 before the fastening element is fastened to the building structure 20.

In the variant where two partition plates 24 are fastened to the building structure 20 by a single fastening element 26, the main seal 27 is, following the fastening of the two partition plates 24 onto the building structure 20, inserted between the two partition plates 24, the main seal being e.g. glued between the partition plates 24.

The facade module 18 as described above is particularly advantageous since same provides a wider choice of aesthetically pleasing facades 12, by making it possible in particular to produce stone facades suitable for forming so-called "curtain wall" facades.

The use of a group of pieces of stone 43 is particularly advantageous since same makes it possible to produce a large stone layer 38, particularly aesthetically pleasing, suitable for a rapid assembly on a light structure. The group of pieces of stone 43 can indeed be installed on a light structure as easily as a standard glass panel. Such a group of pieces of stone 43 is also particularly advantageous for improving the aesthetically pleasing appearance by limiting visible partition lines and, moreover, by limiting damage due to corrosion of the systems of seals.

The proposed solution makes it possible to integrate a stone facade similar to a glass facade, without distinction of fastening system. This approach makes it possible to install and mount a facade with homogeneous appearance between the transparent glazed components and the stone components, without visible demarcation of the contact interfaces and of the fastening systems between said components. Such method can be used to mount a stone facade onto a structural facade.

Moreover, the use of a group of pieces of stone 43 is particularly economical since same makes it possible to make stone facades 12 without having to resort to rare, expensive, heavy and difficult to handle solid stone blocks.

Moreover, the group of pieces of stone 43 also makes it possible to use scrap stone, which is particularly economical.

The dimensions of the stone layer optimize the weight in order to improve the robustness of the facade module without compromising the aesthetically pleasing appearance thereof.

The type of stone chosen provides an aesthetically pleasing appearance along with a high robustness of the facade module.

A plate 24 with a large surface area is advantageous since same provides a reduced number of points of attachment to the building, simplifying the structure of a facade comprising such plate, while having a particularly advantageous aesthetically pleasing appearance.

The presence of the insulation layer 34 provides high insulation for the facade 12.

The insulating layer 34 further advantageously allows the cramp iron 50 to be fastened.

According to a first alternative embodiment (not shown), the facade module 18 differs from the embodiment previously presented solely by the following. Similar elements have the same references.

According to a first variant of such alternative embodiment, the fastening element 26 is an adhesive connecting the base 48 to the inner glazed layer 32. The facade 12 is then e.g. a structurally bonded glazing (Vitrage Extérieur Collé in French).

According to a second variant of said alternative embodiment, the fastening element 26 includes an outer tightening element extending over an edge of the outer face 30 of the facade module 18 and an inner tightening element, extending over an edge of the inner face 28 of the facade module 18. The facade module 18 is then pressed between the inner tightening element and the outer tightening element. The facade 12 is then e.g. a facade structurally beaded facade (Vitrage Extérieur Parclosé in French)

According to a second alternative embodiment (not shown) and independent of the first alternative embodiment and apt to be combined with the latter, the partition plate comprises a plurality of intermediate glazed layers 36 and a plurality of insulation layers 34, the stone layer 38 extending over the intermediate glazed layer closest to the exterior 16.

As illustrated in FIG. 2, the fastening element 26 is preferentially suitable for fastening the partition plate to the building structure 20 by exclusively maintaining the inner glazed layer 32.

In particular, when the cramp iron 50 is in the locking position thereof, the cramp iron 50 directly presses the inner glazed layer 32 against the base 48. The cramp iron 50 is then e.g. at least partially arranged between the inner glazed layer 32 and the intermediate glazed layer 36. Such arrangement of glazed sheets 32, 36 can be used for installing a multiple glazing system, which improves the thermal properties of the facade module and which, moreover, has a particularly satisfactory aesthetically pleasing appearance.

In the variant according in which the facade module 18 comprises at least two partition plates 24 fastened to the building structure 20 by a single fastening element 26, the cramp iron 50 is e.g. arranged between the inner glazed layers 32 and the intermediate glazed layers 36 of the at least two partition plates 24. As illustrated in FIG. 2, the cramp iron 50 extends between the spacers 40 of the at least two partition plates.

The spacers 40 extending to the periphery of the insulating layer 34 are set back from the peripheral edges of the inner glazed layer 32 and/or of the intermediate glazed layer 36. The spacers 40 delimit the insulation volume 40 and a peripheral space of the partition plate 24, intended for receiving the cramp iron 50. In the example shown in FIG. 2, the cramp iron 50 extends into the peripheral space of the two partition plates 24 fastened by the fastening element 26.

The whole fastening element 26 and the whole inner glazed layer 32 preferentially extend on the same side of the stone layer 38. The aesthetically pleasing appearance of the facade module 18, seen from the side of the stone layer 38 opposite the side of the stone layer from which the fastening element 26 extends, is particularly advantageous, the stone layer 38 not being covered by any portion of the fastening element 26.

According to a third alternative embodiment shown in FIG. 3, compatible with the embodiment shown in FIG. 2, the facade module 18 differs from the embodiment previously presented solely in the following. Similar elements have the same references.

The partition plate 24 comprises a receiving profile 70 and an outer seal 72.

Figure 3:
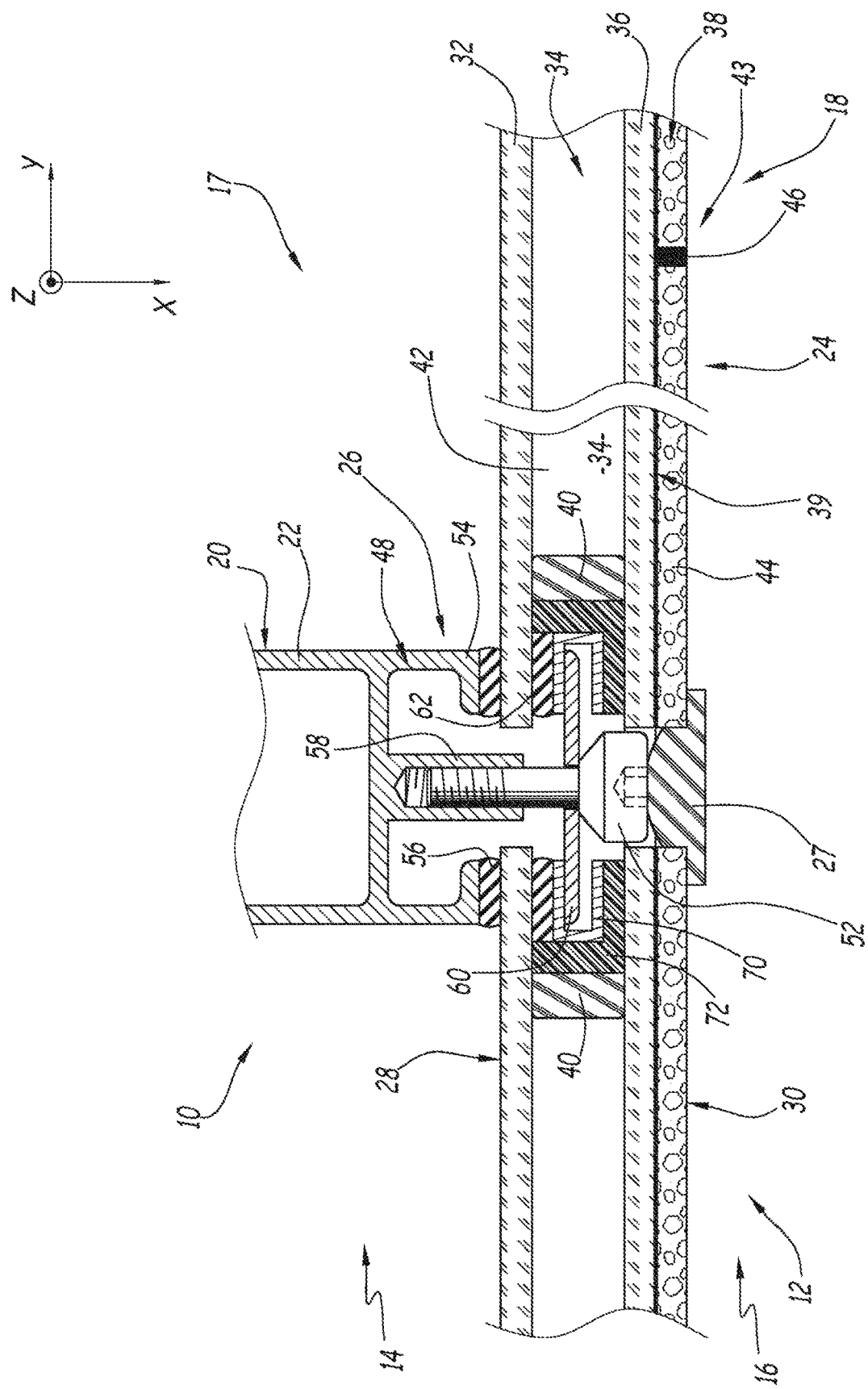
FIG. 3 is a view similar to the view shown in FIG. 2 of a partition plate according to another embodiment.

As shown in FIG. 3, the receiving profile 70 extends between the inner glazed layer 32 and the intermediate glazed layer 36.

The receiving profile 70 is e.g. made of aluminum.

The receiving profile 70 is e.g. a profile having a U-shaped cross-section The receiving profile 70 forms a cavity open toward the edge of the partition plate 24. The tightening bar 60 is e.g. at least partially inserted into the cavity formed by the receiving profile 70 so as to extend at least partially into the cavity formed by the receiving profile 70 when the cramp iron 50 is in the locking position.

The intermediate seal 62 extends between the receiving profile 70 and the inner glazed layer 32 and is preferentially squeezed between the receiving profile 70 and the inner glazed layer 32 when the cramp iron 50 is in the locking position thereof.

The outer seal 72 extends between the inner glazed layer 32 and the intermediate glazed layer 36.

The outer seal 72 extends between the receiving profile 70 and the intermediate glazed layer 36. The outer seal 72 preferentially connects the receiving profile 70 and the intermediate glazed layer 36.

The outer seal 72 extends e.g. between the receiving profile 70 and the spacer 40. The outer seal 72 connects e.g. the receiving profile 70 and the spacer 40.

As illustrated in FIG. 3, the outer seal 72 has e.g. the shape of a profile seal with an L-shaped cross-section, one branch of the L extending between the receiving profile 70 and the intermediate glazed layer 36 and the other branch of the L extending between the receiving profile 70 and the spacer 40.

In a particular embodiment (not shown), the outer seal 72 is integral with the intermediate seal 62. The outer seal 72 and the intermediate seal 62 then together form a U-shaped assembly, defining e.g. a cavity wherein the receiving profile 70 is arranged.

Such embodiment can be used for a better distribution of the tightening load of the cramp iron 50 over the inner glazed layer 32, improving the robustness of the facade module 18.

The invention claimed is:

1. A facade module for separating an interior from an exterior of a building volume, comprising:
    at least one partition plate, comprising an inner face and an outer face, the partition plate comprising an inner glazed layer forming the inner face, and a fastening element of the partition plate, which is configured to fasten the partition plate to a building structure, the partition plate comprising at least one stone layer forming the outer face of the partition plate, wherein the partition plate comprises an intermediate glazed layer, the intermediate glazed layer extending between the inner glazed layer and the stone layer, the partition plate comprising a bonding agent bonding the intermediate glazed layer and the stone layer, and wherein the fastening element comprises:

a base configured to be rigidly attached to the building structure;

a cramp iron; and locking means, configured to connect the base to the cramp iron and move the cramp iron between a free position and a locking position, wherein the cramp iron presses the inner glazed layer against the base, the fastening element is configured to hold the partition plate onto the building structure when the cramp iron is in the locking position, wherein the cramp iron comprises a tightening bar, and the partition plate comprises a receiving profile extending between the inner glazed layer and the intermediate glazed layer, wherein a shape of the receiving profile in a cross section is U-shaped forming a cavity between the inner glazed layer and the intermediate glazed layer, and wherein the tightening bar extends at least partially into the cavity formed by the U-shaped receiving profile when the cramp iron is in the locking position thereof.

2. The facade module according to claim 1, wherein the stone layer consists of a group of pieces of stone, the group of pieces of stone comprising a plurality of pieces of stone and a binding agent, the binding agent connecting the pieces of stone to each other.

3. The facade module according to claim 2, wherein the stone layer includes between one and ten pieces of stone, each piece of stone being a slice of stone with a thickness of between 3 mm and 12 mm.

4. The facade module according to claim 2, wherein the pieces of stone of the stone group of pieces of stone consist of at least one opaque ornamental stone.

5. The facade module according to claim 1, wherein an inner surface area and/or an outer surface area of the partition plate is greater than 1 m$^2$.

6. A building facade comprising at least one facade module according to claim 1 and a building structure, the fastening element fastening the partition plate to the building structure.

7. The building facade according to claim 6, wherein the facade module comprises at least two partition plates fastened to the building structure by a single fastening element, the fastening element extending between the two partition plates.

8. The facade module of claim 4, wherein the pieces of stone of the stone group of pieces of stone are selected from the group consisting of: marble, granite, quartz, and limestone.

9. The facade module according to claim 3, wherein the pieces of stone of the stone group of pieces of stone consist of at least one opaque ornamental stone.

10. The facade module according to claim 2, wherein an inner surface area and/or an outer surface area of the partition plate is greater than 1 m$^2$.

11. The facade module according to claim 3, wherein an inner surface area and/or an outer surface area of the partition plate is greater than 1 m$^2$.

12. The facade module according to claim 4, wherein an inner surface area and/or an outer surface area of the partition plate is greater than 1 m$^2$.

* * * * *

UNITED STATES PATENT AND TRADEMARK OFFICE
CERTIFICATE OF CORRECTION

PATENT NO.        : 12,247,404 B2
APPLICATION NO.   : 17/916762
DATED             : March 11, 2025
INVENTOR(S)       : Pierre Orjebin Page 1 of 1

It is certified that error appears in the above-identified patent and that said Letters Patent is hereby corrected as shown below:

On the Title Page

Item (71), Column 1, Line 1, delete "KERNEX, Paris (FR);" and insert --MINERAL EXPERTISE, Paris (FR);--.

Signed and Sealed this
Twenty-second Day of July, 2025

Coke Morgan Stewart
*Acting Director of the United States Patent and Trademark Office*